US012631802B2

(12) United States Patent　　　　　　(10) Patent No.: US 12,631,802 B2

Le et al.　　　　　　　　　　　　　　　(45) Date of Patent: May 19, 2026

(54) OPTICAL SYSTEM

(71) Applicant: 3M INNOVATIVE PROPERTIES COMPANY, St. Paul, MN (US)

(72) Inventors: John D. Le, Woodbury, MN (US); Timothy L. Wong, West Saint Paul, MN (US); Michael L. Steiner, New Richmond, WI (US); David J. W. Aastuen, Shoreview, MN (US); Kayla A. McGrath, Cottage Grove, MN (US); Matthew C. Dachel, Baldwin, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 534 days.

(21) Appl. No.: 18/100,150

(22) Filed: Jan. 23, 2023

(65) Prior Publication Data

US 2023/0244010 A1　　Aug. 3, 2023

Related U.S. Application Data

(60) Provisional application No. 63/267,305, filed on Jan. 31, 2022.

(51) Int. Cl.
　　*G02B 5/02*　　　　(2006.01)
　　*G02B 5/30*　　　　(2006.01)
　　*G02B 17/08*　　　(2006.01)
(52) U.S. Cl.
　　CPC .............. *G02B 5/0284* (2013.01); *G02B 5/30* (2013.01); *G02B 17/08* (2013.01); *G02B 5/0236* (2013.01)

(58) Field of Classification Search
　　CPC ...... G02B 5/0236; G02B 5/0284; G02B 5/30; G02B 17/08
　　See application file for complete search history.

(56) References Cited

U.S. PATENT DOCUMENTS

| | | | | |
|---|---|---|---|---|
| 5,499,138 A * | 3/1996 | Iba | ....................... | G02B 5/1842 |
| | | | | 359/569 |
| 6,007,209 A * | 12/1999 | Pelka | ................ | G02F 1/133603 |
| | | | | 362/97.3 |
| 6,724,354 B1 * | 4/2004 | Spitzer | ................. | G02B 27/283 |
| | | | | 345/32 |
| 9,857,594 B2 * | 1/2018 | Kizu | .................... | G02B 3/0087 |

(Continued)

FOREIGN PATENT DOCUMENTS

| | | | | | |
|---|---|---|---|---|---|
| CN | 108027459 A | * | 5/2018 | ........... | G02B 3/0068 |

*Primary Examiner* — Daniel Petkovsek
(74) *Attorney, Agent, or Firm* — Jonathan L. Tolstedt

(57) ABSTRACT

An optical system includes a display, at least one lens, and at least one of a partial reflector and a reflective polarizer. The optical system forms a virtual image of an image emitted by the display for viewing by an eye. The emitted image includes a plurality of cones of image light. Each cone of image light propagates from a different corresponding location on the emitted image and includes a central light ray propagating along a central axis, such that in each of orthogonal first and second planes that include the central axis, an intensity distribution of the cone of image light as a function of angle relative to the central axis includes a substantially flat peak having a full width of at least 15 degrees across which the peak changes by less than about 20%, and a corresponding fullwidth at half maximum that is less than about 60 degrees.

13 Claims, 9 Drawing Sheets

(56) References Cited

U.S. PATENT DOCUMENTS

| 11,719,936 | B2 * | 8/2023 | He | ...................... | G02B 25/001 |
| | | | | | 359/630 |
| 2002/0089467 | A1 * | 7/2002 | Hara | ................ | G02F 1/133526 |
| | | | | | 345/4 |

* cited by examiner

OPTICAL SYSTEM

TECHNICAL FIELD

The present disclosure relates, in general, to optical systems. More particularly, the present disclosure relates to optical systems used for virtual reality/augmented reality applications.

BACKGROUND

Virtual reality (VR) and augmented reality (AR) are used in various applications, such as entertainment, industrial applications, gaming, healthcare, etc. A folded optics lens module may enhance performance of a display device in some VR/AR applications. However, commercially available display devices are typically not designed for folded optics lens modules.

SUMMARY

In a first aspect, the present disclosure provides an optical system substantially centered on an optical axis. The optical system further includes a display panel configured to generate an image. The optical system is configured to display a virtual image of the generated image to an eye of a viewer disposed within an eye box. The optical system further includes an illumination source configured to provide maximum intensity of the virtual image at a given field for a particular eye location. The emission surface of the illumination source may be smaller in length and width than the display panel. A cone of light emitted from each location on the emission surface includes a central light ray propagating substantially along a direction parallel to the optical axis and has a peak intensity and corresponding full widths W80 and W30 at respective eighty and thirty percent of maximum, W80 and W30 are within about 30% of each other. The optical system further includes a light redirecting film disposed between the display panel and the emission surface of the illumination source, and including a regular array of light redirecting elements configured to receive, transmit, and redirect at least some of, the cones of light emitted from the emission surface so that the transmitted cones of light substantially cover the display panel and are transmitted thereby as corresponding cones of image light. The optical system further includes a lens assembly disposed between the display panel and the eye location, and including at least one of a lens, a partial reflector, and a reflective polarizer, such that the cones of image light pass to the eye location in the eye box after being focused by the lens assembly.

In a second aspect, the present disclosure provides an optical system. The optical system includes a display, at least one lens, and at least one of a partial reflector and a reflective polarizer. The optical system forms a virtual image of an image emitted by the display for viewing by an eye. The emitted image includes a plurality of cones of image light. Each cone of image light propagates from a different corresponding location on the emitted image and includes a central light ray propagating along a central axis, such that in each of orthogonal first and second planes that include the central axis, an intensity distribution of the cone of image light as a function of angle relative to the central axis may include a substantially flat peak having a full width of at least 15 degrees across which the peak changes by less than about 20%, and a corresponding fullwidth at half maximum that is less than about 60 degrees. Alternatively, the intensity distribution of the cone of image light may be described as a truncated Lambertian profile.

In a third aspect, the present disclosure provides an optical system. The optical system is substantially centered on an optical system axis and includes a display system, at least one lens, and a reflective polarizer. The display system is configured to generate a pixelated image including a plurality of image pixels. The optical system is configured to display a virtual image of the generated pixelated image in focus to an eye of a viewer disposed at or near the optical system axis with an optical axis of the eye substantially coincident with the optical system axis, such that a first image pixel of the pixelated image farthest from the optical system axis and a second image pixel of the pixelated image closest to the optical system axis emit respective first and second cones of image light having respective first and second central light rays making a first angle of greater than about 15 degrees and a second angle of less than about 5 degrees, respectively, with the optical system axis. The first and second central light rays both enter the eye of the viewer after passing through the at least one lens and the reflective polarizer.

In a fourth aspect, the present disclosure provides an optical system. The optical system is substantially centered on an optical system axis and includes a display system, at least one lens, a reflective polarizer, and an eye box. The eye box includes a center disposed on the optical system axis. The display system is configured to generate a pixelated image including a plurality of image pixels. The optical system is configured to display a virtual image of the generated pixelated image to an eye of a viewer disposed in the eye box, such that a first image pixel of the pixelated image farthest from the optical system axis emits a first cone of image light that after passing through the at least one lens and the reflective polarizer, enters the eye box and crosses the optical system axis in the eye box at or near a peak intensity of the first cone of image light.

In a fifth aspect, the present disclosure provides an optical system. The optical system is centered on an optical system axis and includes a display system, at least one lens, and a reflective polarizer. The optical system forms a virtual image of an image emitted by the display system for viewing by an eye when the eye is positioned proximate an eye-location on an eye-side of the optical system, such that for a first virtual image location at a corresponding first field angle of between about 15 degrees and about 50 degrees relative to the optical system axis, when an imaging system centered on an imaging system axis is positioned proximate the eye-location and forms an image of the virtual image corresponding to the first virtual image location, an intensity of the formed image increases as the imaging system is at least rotated so that the imaging system axis approaches the first field angle.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
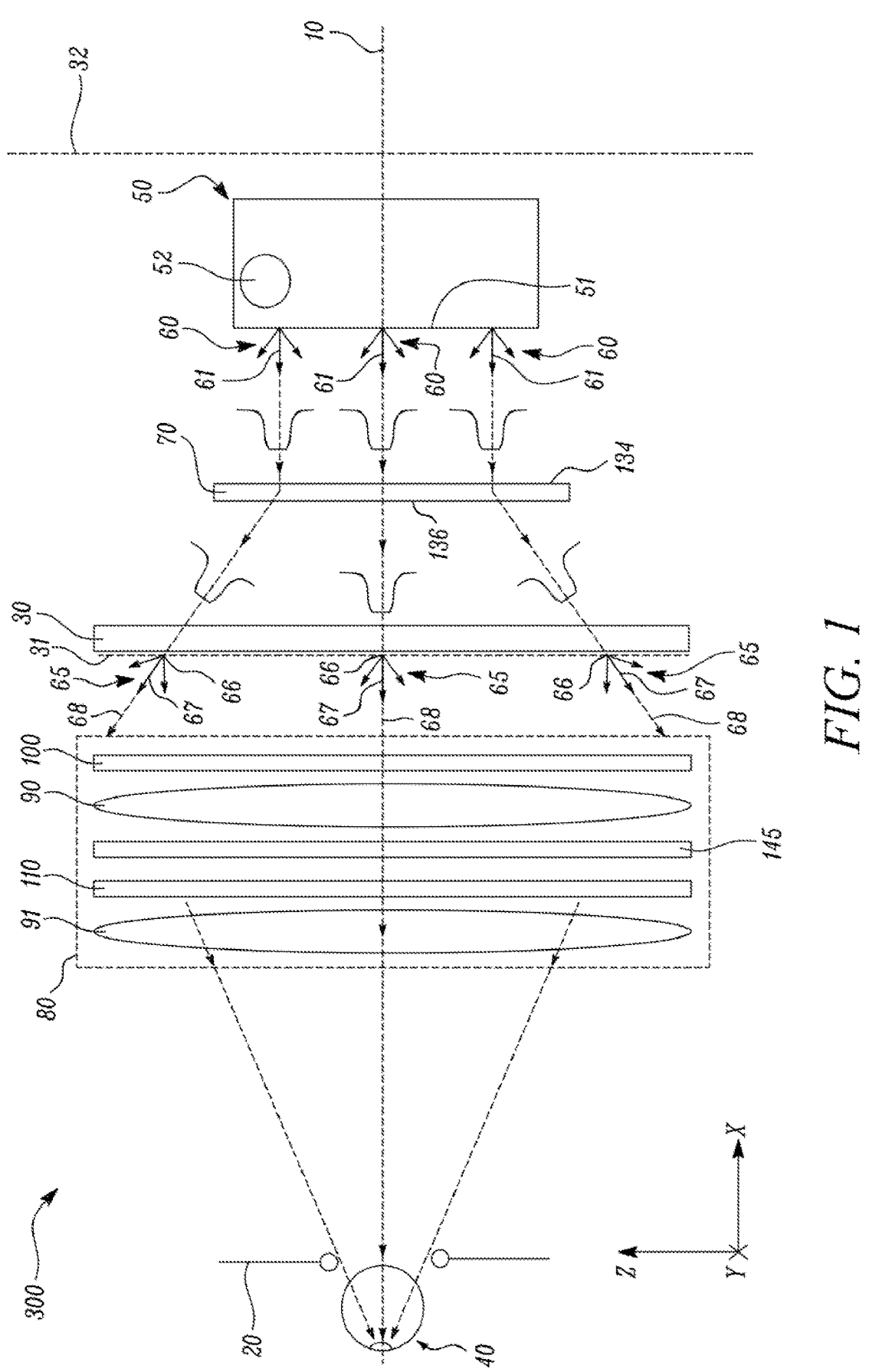
FIG. 1 illustrates a schematic view of an optical system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "adhesive" generally refers to polymeric compositions useful to adhere together two adherends. Examples of adhesives may include curable adhesives, heat activated adhesives, pressure sensitive adhesives, or combinations thereof.

As used herein, the term "diffuser" generally refers to any film, layer, or substrates that are designed to diffuse light. This light diffusion may be affected, for example, through use of a textured surface of the substrate, or through other means such as incorporation of light diffusing particles within a matrix of the film. While it is noted that all optical articles can be considered to diffuse light to some extent, substrates and films that are optically transparent or optically clear are not considered to be "light diffusing" unless some light diffusing property is imparted to these substrates or films.

The present disclosure relates to optical systems used for virtual reality (VR)/augmented reality (AR) applications, such as entertainment, industrial applications, gaming, healthcare, etc. In some cases, the optical system may be used in a head-mounted display (HMD). In some embodiments, the optical system may be worn on a head of a viewer or may be included as a part of a headgear (e.g., helmet), that has a small display optic in front of an eye, such as in a monocular display device, or two eyes, such as in a binocular display device.

A folded optics lens module may be used with a display device to provide a compact design, a high resolution, wide viewing angles, and low distortions for VR/AR applications. However, current display devices are typically not designed for folded optics lens modules. Specifically, a display's angular output profile centered on the normal to a display surface of the display device may match the folded optics lens module at the center and may result in high contrast at the center, but may not match the folded optics lens module at a far field, resulting in lower light intensity due to vignetting at the far field.

In some cases, a display's wide-angle output profile may be used to achieve a more uniform viewing intensity, however, the wide-angle display output may enter the folded optics lens module at input paths different from an optimal design path, resulting in ghost images and degradation of contrast. This may adversely impact the experience of the viewer using the display device.

The optical system of the present disclosure is substantially centered on an optical axis. The optical system further includes a display panel configured to generate an image. The optical system is configured to display a virtual image of the generated image to an eye of a viewer disposed on the optical axis within an eye box. The eye box is generally considered to be that volume in which the pupil can be located in order to acceptably view the virtual image. The optical system further includes an illumination source configured to provide illumination to the display panel from an emission surface thereof. The emission surface may be smaller in length and width than the display panel. A cone of light emitted from each location on the emission surface includes a central light ray propagating substantially along a direction parallel to the optical axis and has a peak intensity and corresponding full widths W80 and W30 at respective eighty and thirty percent of maximum, W80 and W30 are within about 30% of each other, that is, the difference between W80 and W30 is less than about 30% of W80. The optical system further includes a light redirecting film disposed between the display panel and the emission surface of the illumination source, and including a plurality of light redirecting elements configured to receive, transmit, and redirect at least some of, the cones of light emitted from the emission surface so that the transmitted cones of light substantially cover the display panel and are transmitted thereby as corresponding cones of image light. In some embodiments, the plurality of light redirecting elements may be a regular array of elements considered to be circularly symmetric, such as those included in a Fresnel lens. In other embodiments, the plurality of light redirecting elements may be a one-dimensional array of structures. In another embodiment, the plurality of light directing elements may include a collection of diffractive structures. The optical system further includes a lens assembly disposed between the display panel and the eye box, and including at least one of a lens, a partial reflector, and a reflective polarizer, such that the cones of image light pass to the eye box after being focused by the lens assembly.

The cone of light is substantially on-axis. Further, the light redirecting film receives, transmits, and redirects at least some of, the cones of light emitted from the emission surface so that the transmitted cones of light substantially cover the display panel. An angle between central rays of the transmitted cones of light and the optical axis may vary spatially across the display panel. For example, the central rays of the transmitted cones of light proximal to the optical axis may be substantially parallel to the optical axis. However, the central rays of the transmitted cones of light distal to the optical axis may be inclined to the optical axis. This may ensure that the transmitted cones of light substantially cover the display panel despite the emission surface being smaller in the length and width than the display panel. Further, this may improve luminance uniformity of the virtual image by reducing vignetting of the transmitted cones of light in the far field.

The optical system of the present disclosure may therefore provide an improved luminance uniformity, contrast, and brightness of the virtual image, and may reduce optical artifacts, such as ghost images in the virtual image. Further, the optical system may be compact.

In order to characterize the performance of the optical system, a physical aperture stop can be used in lieu of the eye pupil. This enables optical system characterization that is not dependent on human viewing factors.

FIG. 1 illustrates a schematic view of an optical system 300, according to an embodiment of the present disclosure. The optical system 300 may be used in AR and VR applications.

The optical system 300 defines mutually orthogonal X, Y, and Z-axes. The Y and Z-axes are the in-plane axes of the optical system 300, while the X-axis is a transverse axis along a thickness of the optical system 300. In other words, Y and Z-axes are disposed along a plane of the optical system 300, while the X-axis is substantially perpendicular to the plane of the optical system 300.

The optical system 300 is substantially centered on an optical axis 10. In some embodiments, the optical axis 10 is substantially parallel to the X-axis. The optical axis 10 may be interchangeably referred to as the "optical system axis 10". In other embodiments, the display panel 30 may not be centered on the optical axis 10.

The optical system 300 includes a physical aperture stop 20 useful for system characterization. In some embodiments, the aperture stop 20 has a size of between about 1 millimeter (mm) and about 10 mm. In some embodiments, the aperture stop 20 has a size of between about 2 mm and about 9 mm, between about 2 mm and about 8 mm, between about 2 mm and about 7 mm, or between about 3 mm and about 7 mm. The aperture stop 20 may include an aperture or an opening through which light travels. The aperture stop 20 may block some of the rays of the cones of light. Therefore, the aperture stop 20 may reduce a brightness of some parts of the virtual image. In some examples, the optical system 300 may include an eye box.

The optical system 300 further includes a display 30. The display 30 may be interchangeably referred to as the "display panel 30". The display panel 30 may include an electronic display device that is used to display content, such as still images, moving images, text, visual materials, and the like. The display panel 30 may include a liquid crystal display (LCD)

The display panel 30 is configured to generate an image 31. The optical system 300 forms a virtual image 32 of the image 31 emitted by the display panel 30 for viewing by an eye 40. In some cases, the image 31 may be interchangeably referred to as "the generated image 31" or "the emitted image 31". Specifically, the optical system 300 is configured to display the virtual image 32 of the generated image 31 to the eye 40 of a viewer disposed substantially on the optical axis 10 proximate the aperture stop 20. In some embodiments, the optical system 300 is configured to display the virtual image 32 of the generated image 31 to the eye 40 of the viewer disposed within the eye box. The eye box may include a volume in which the pupil of the eye 40 can be located in order to acceptably view the virtual image 32.

The emitted image 31 includes a plurality of cones of image light 65, each cone of image light 65 propagating from a different corresponding location 66 on the emitted image 31 and including a central light ray 67 propagating along a central axis 68.

The optical system 300 further includes an illumination source 50 configured to provide illumination to the display panel 30 from an emission surface 51 thereof. In some examples, the illumination source 50 may be configured to provide maximum intensity of the virtual image 32 at a given field for a particular eye location.

In some embodiments, the illumination source 50 includes at least one light source 52. In the illustrated embodiment of FIG. 1, the illumination source 50 includes a single light source 52. In some other embodiments, the illumination source 50 may include more than one light source 52, as per desired application attributes. Further, the at least one light source 52 is shown substantially circular in shape. However, the at least one light source 52 may have any suitable shape, for example, a square shape, a rectangular shape, an elliptical shape, a polygonal shape, etc. In some embodiments, the at least one light source 52 may include more than one light source 52 having same or different sizes based on desired application attributes.

In some embodiments, the at least one light source 52 may include one or more light emitters that emit light. In some embodiments, the at least one light source 52 includes a light emitting diode (LED). In some other embodiments, the at least one light source 52 may include any other type of light emitters, for example, fluorescent lights, or any other suitable light emitting device. In some embodiments, multiple light emitters of the at least one light source 52 may be controlled in unison by a control circuitry (not shown) or may be individually controlled. In some embodiments, the at least one light source 52 may emit light of any suitable color (e.g., blue, red, green, white, etc.). In some other embodiments, the at least one light source 52 may be monochromatic or may include a number of light emitters operating at different wavelengths in order to produce a white light output. In some embodiments, the at least one light source 52 includes one or more of a blue light emitting light source, a green light emitting light source, a red light emitting light source, and a white light emitting light source.

As illustrated in FIG. 1, the emission surface 51 emits multiple cones of light 60. The cone of light 60 emitted through each location on the emission surface 51 includes a central light ray 61 propagating substantially along a direction parallel to the optical axis 10. In some embodiments, the central light ray 61 of each cone of light 60 emitted through each location on the emission surface 51 makes an angle of less than about 5 degrees with the optical axis 10. In some other embodiments, the central light ray 61 of each cone of light 60 emitted through each location on the emission surface 51 makes an angle of less than about 4 degrees, less than about 3 degrees, less than about 2 degrees, or less than about 1.5 degrees with the optical axis 10. Therefore, the cones of light 60 are substantially on-axis i.e., their central light rays 61 are substantially parallel to each other.

The optical system 300 further includes a light redirecting film 70 disposed between the display panel 30 and the emission surface 51 of the illumination source 50. The light redirecting film 70 is configured to receive, transmit, and redirect at least some of, the cones of light 60 emitted through the emission surface 51 so that transmitted cones of light substantially cover the display panel 30 and are transmitted thereby as corresponding cones of image light 65. In some embodiments, a refractive index of light redirecting film 70 may range from about 1.45 to about 1.80.

The light redirecting film 70 defines a first surface 136 facing the display panel 30 and an opposing second surface 134 facing the emission surface 51. The light redirecting film 70 may cause an angular spread of the cones of light 60 such that that the transmitted cones of light substantially cover the display panel 30. The light redirecting film 70 may include an array of light redirecting elements 71, 71' (shown in FIGS. 4A and 4B, respectively). In some examples, the light redirecting elements 71, 71' may be circularly symmetric, such as those included in a Fresnel lens. In other words, the array of light redirecting elements 71, 71' may be facets of a Fresnel lens. As discussed above, the transmitted cones of light are further transmitted thereby as the corresponding cones of image light 65. Thus, the light redirecting film 70 may improve a luminance uniformity of the image 31.

The optical system 300 further includes a lens assembly 80 disposed between the display panel 30 and the aperture stop 20. The lens assembly 80 is disposed between the display panel 30 and the aperture stop 20, such that the cones of image light 65 pass through the aperture stop 20 after going through the lens assembly 80.

The lens assembly 80 includes at least one of a lens 90, 91, a partial reflector 100, and a reflective polarizer 110. In some cases, the optical system 300 includes the at least one lens 90, 91, and at least one of the partial reflector 100 and the reflective polarizer 110. The at least one lens 90, 91, and the at least one of the partial reflector 100 and the reflective polarizer 110 are disposed between the aperture stop 20 and the display 30.

In some embodiments, the lens assembly 80 includes the lens 90. In some embodiments, the lens assembly 80 includes the lens 91. In some embodiments, the at least one lens 90, 91 may include a Fresnel lens. In some embodiments, the at least one lens 90, 91 may include a planar lens, a concave lens, or a convex lens. In some embodiments, the at least one lens 90, 91 may include a biconvex lens. In some embodiments, the at least one lens 90, 91 may include any type of lens based on desired application attributes. In some embodiments, the optical system 300 includes at least two lenses 90, 91. In some embodiments, the lens 90 and the lens 91 may be substantially similar. In some embodiments, the lens 90 and the lens 91 may be different. In some embodiments, the lens 90 and the lens 91 may include suitable materials, such as glass, polymethyl methacrylate (PMMA), polycarbonate, and the like.

In some embodiments, the at least one lens 90, 91 may focus the cones of image light 65 for viewing by the eye 40. In some embodiments, the at least one lens 90, 91 may focus or disperse the cones of image light 65 by means of refraction.

In some embodiments, the lens assembly 80 includes the at least one lens 90, 91, the partial reflector 100, and the reflective polarizer 110. In such embodiments, each of the cones of image light 65 passes through the aperture stop 20 after going through each of the at least one lens 90, 91, the partial reflector 100, and the reflective polarizer 110. In some embodiments, each of the cones of image light 65 passes through the aperture stop 20 after being focused by the lens assembly 80. In some embodiments, each of the cones of image light 65 passes through the aperture stop 20 after being focused by each of the at least one lens 90, 91, the partial reflector 100, and the reflective polarizer 110.

In some embodiments, each of the cones of image light 65 passes through the aperture stop 20 after further being reflected at least once by each of the partial reflector 100 and the reflective polarizer 110. In other words, each of the cones of image light 65 may pass through the aperture stop 20 after being reflected at least once between the partial reflector 100 and the reflective polarizer 110.

In some embodiments, the optical system 300 further includes a retarder layer 145, such that for the central light ray 67 of at least one of the cones of image light 65, the retarder layer 145 changes a phase of the central light ray 67 by at least 20 degrees. In some embodiments, for the central light ray 67 of at least one of the cones of image light 65, the retarder layer 145 changes the phase of the central light ray 67 by at least 25 degrees, at least 30 degrees, at least 35 degrees, at least 40 degrees, or at least 45 degrees. In some embodiments, for the central light ray 67 of at least one of the cones of image light 65, the retarder layer 145 changes the phase of the central light ray 67 by at most 70 degrees, at most 80 degrees, at most 90 degrees, at most 100 degrees, or at most 110 degrees. In the illustrated embodiment of FIG. 1, the retarder layer 145 is disposed between the lens 90 and the reflective polarizer 110. In some embodiments, the retarder layer 145 includes a birefringent material. The birefringent material may include quartz, mica, plastic, and the like.

In some embodiments, adjacent components of the lens assembly 80 are laminated to each other. In some embodiments, adjacent components of the lens assembly 80 are bonded to each other via an optically clear adhesive layer, or an epoxy layer. In some embodiments, adjacent components of the lens assembly 80 may include an air gap therebetween. For example, the reflective polarizer 110 and the lens 91 may be laminated to each other, the reflective polarizer 110 and the retarder layer 145 may include an air gap therebetween, the retarder layer 145 and the lens 90 may be bonded to each other, and the partial reflector 100 may be coated on the lens 90.

In some embodiments, the eye 40 may be located 5 mm behind the aperture stop 20, may be located 3 mm behind the aperture stop 20, may be located 1 mm behind the aperture stop 20, or may be located partially within the aperture stop 20. In some other embodiments, the pupil of the eye 40 may function as the aperture stop 20.

Figure 2:
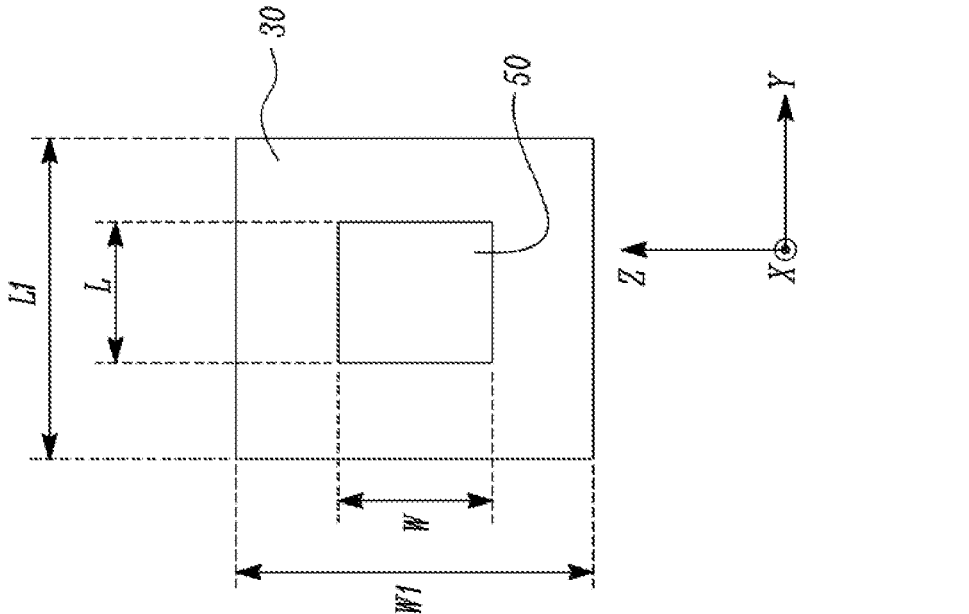
FIG. 2 illustrates a schematic view of a display panel and an illumination source of the optical system of FIG. 1, according to an embodiment of the present disclosure.

FIG. 2 illustrates a top view of the illumination source 50 and the display panel 30, according to an embodiment of the present disclosure. As shown, the display panel 30 defines a length L1 and a width W1. The emission surface 51 (shown in FIG. 1) of the illumination source 50 defines a length L and a width W. In some embodiments, the emission surface 51 of the illumination source 50 is smaller than the display panel 30. Specifically, the emission surface 51 may be smaller in length and width than the display panel 30. In other words, the length L of the emission surface 51 may be less than the length L1 of the display panel 30. Similarly, the width W of the emission surface 51 may be less than the width W1 of the display panel 30. Therefore, an area of the emission surface 51 may be less than a surface area of the display panel 30. In some embodiments, the emission surface 51 is smaller in at least one of the length L and width W than the display panel 30 by at least 20%. In other words, in some embodiments, the length L of the emission surface 51 is less than the length L1 of the display panel 30 by at least 20% and/or the width W of the emission surface 51 is less than the width W1 of the display panel 30 by at least 20%. In some examples, the emission surface 51 may be smaller in at least one of the length L and the width W than the display panel 30 by at least 30%, at least 40%, or at least 50%.

In the illustrated embodiment of FIG. 2, each of the illumination source 50 and the display 30 has a substantially rectangular shape. However, the illumination source 50 and the display 30 may have any suitable shape, for example, a square shape, an elliptical shape, a circular shape, a polygonal shape, a symmetric shape with one truncated side or edge, etc. Similarly, the emission surface 51 may have any suitable shape, for example, a square shape, an elliptical shape, a circular shape, a polygonal shape, a symmetric shape with one truncated side or edge, etc.

Figure 3:
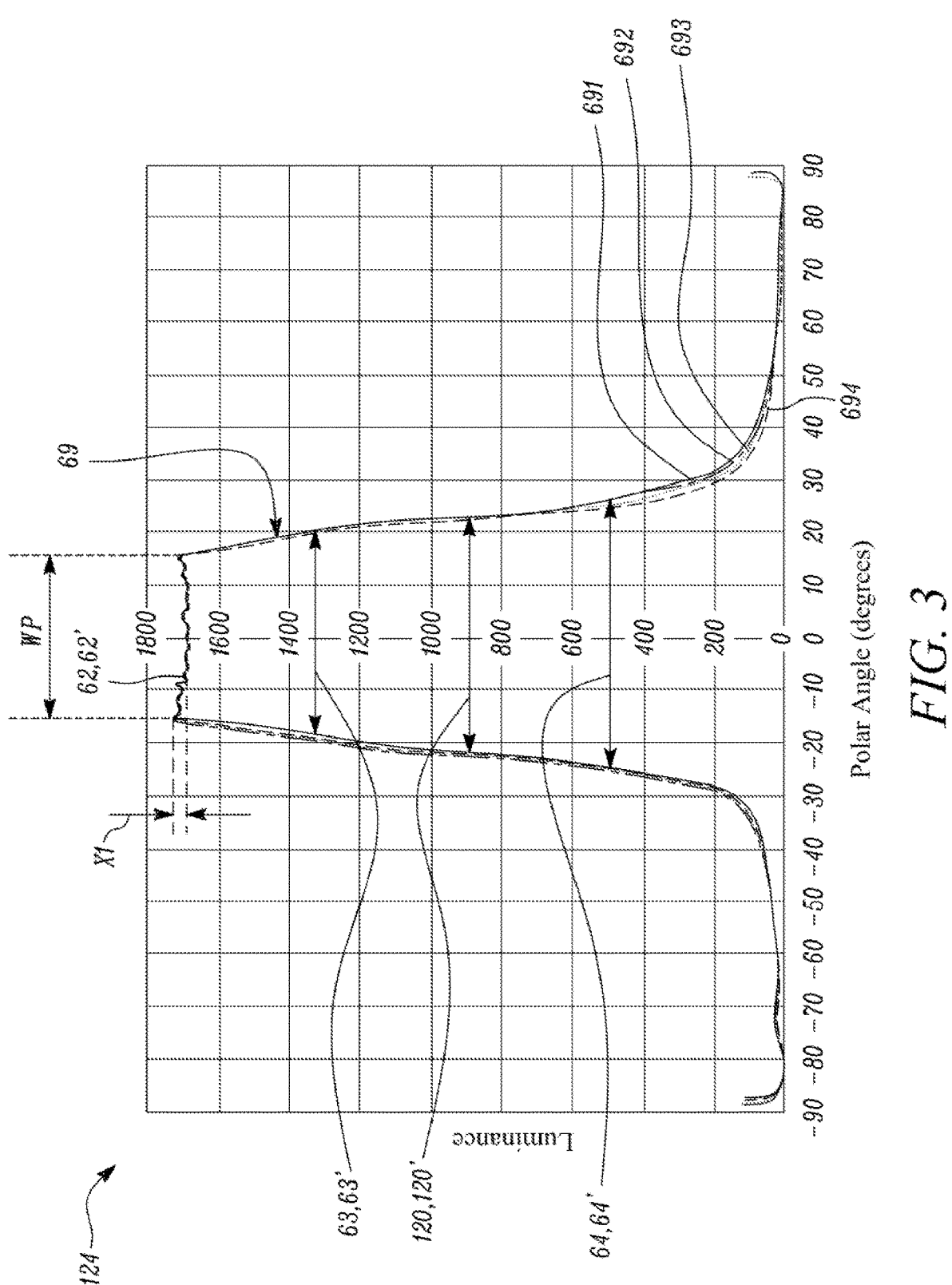
FIG. 3 illustrates a plot depicting an intensity distribution of a cone of light and a cone of image light of the optical system of FIG. 1, according to an embodiment of the present disclosure.

FIG. 3 illustrates a graph 124 depicting luminance versus polar angle of the cone of light 60 (shown in FIG. 1) and the cone of image light 65 (shown in FIG. 1), according to an embodiment of the present disclosure. Polar angle is expressed in degrees in the abscissa. Luminance is shown in the ordinate.

The graph 124 includes an intensity distribution 69 including a first plot 691 corresponding to 0 degree or the X-Z plane, a second plot 692 corresponding to 45 degrees, a third plot 693 corresponding to 90 degrees or the Y-Z-plane, and a fourth plot 694 corresponding to 135 degrees. As is apparent from the intensity distribution 69, the cone of light 60 and the cone of image light 65 are rotationally symmetric.

Referring to FIGS. 1 and 3, the cone of light 60 has a peak intensity 62 and corresponding full widths at respective eighty and thirty percent of maximum, W80 and W30. W80 is indicated by 63 and W30 is indicated by 64 in FIG. 3. W80 and W30 are within about 30% of each other, that is, the difference between W80 and W30 is less than about 30% of W80. In some embodiments, W80 and W30 within about 25%, about 20%, about 15%, or about 10% of each other. In the illustrated embodiment of FIG. 3, W80 and W30 are within about 10% of each other.

In some embodiments, the peak intensity 62 has a full width WP. In some embodiments, the full width WP is at least 15 degrees. In some embodiments, the full width WP is at least 20 degrees, or about 25 degrees.

In some embodiments, each of the cones of light 60 includes a corresponding fullwidth at half maximum 120 that is less than about 60 degrees. In some embodiments, the corresponding fullwidth at half maximum 120 is less than about 55 degrees, about 50 degrees, or about 45 degrees. Each of the cones of light 60 has a substantially high intensity for a range of polar angles in the corresponding fullwidth at half maximum 120.

As discussed above, the light redirecting film 70 disposed between the display panel 30 and the emission surface 51 of the illumination source 50 is configured to receive, transmit, and redirect at least some of the cones of light 60 emitted through the emission surface 51 so that transmitted cones of light substantially cover the display panel 30 and are transmitted thereby as the corresponding cones of image light 65.

In some embodiments, each of the transmitted cones of light transmitted by the light redirecting film 70 has a peak intensity 62' and corresponding full widths W'80 and W'30 at respective eighty and thirty percent of maximum. W'80 is indicated by 63' and W'30 is indicated by 64' in FIG. 3. The peak intensity 62' may be interchangeably referred to as the "peak 62'". In some embodiments, W'80 and W'30 are within about 30% of each other, that is, the difference between W'80 and W'30 is less than about 30% of W'80. In some embodiments, W'80 and W'30 are within about 25%, about 20%, about 15%, or 10% of each other. As is apparent from the intensity distribution 69, the peak intensity 62' is substantially similar to the peak intensity 62. Further, the corresponding full widths W'80 and W'30 are substantially similar to the corresponding full widths W80 and W30, respectively. Therefore, each of the transmitted cones of light transmitted by the light redirecting film 70 and each of the cones of light 60 emitted through each location on the emission surface 51 may have substantially similar luminance width characteristics, though their central rays are offset by varying amounts.

In some embodiments, the substantially flat peak 62' has the full width WP of at least 15 degrees. In some embodiments, the full width WP is at least 20 degrees, or about 25 degrees.

In some embodiments, in each of orthogonal first and second planes that include the central axis 68, the intensity distribution 69 of the cone of image light 65 as a function of angle relative to the central axis 68 includes the substantially flat peak 62'. In some embodiments, the first plane may be the X-Z plane and the second plane may be the X-Y plane.

In some embodiments, each of the cones of image light 65 includes the substantially flat peak 62' having the full width WP across which the peak 62' changes by less than about 20%. In the illustrated embodiment of FIG. 3, the percentage change in the peak 62' across the full width WP is denoted by X1. Therefore, X1 is less than about 20%. In some embodiments, each of the cones of image light 65 includes the substantially flat peak 62' having the full width WP across which the peak 62' changes by less than about 15%, about 10%, or about 5%. Therefore, in some embodiments, X1 is less than about 15%, about 10%, or about 5%. Since, the substantially flat peak 62' has the full width WP of at least 15 degrees, the cones of image light 65 may have a substantially uniform peak intensity 62' for angles within the full width WP. Therefore, the optical system 300 (shown in FIG. 1) may provide an improved luminance uniformity of the image 31.

In some embodiments, the intensity distribution 69 includes a corresponding fullwidth at half maximum 120' that is less than about 60 degrees. In some embodiments, the corresponding fullwidth at half maximum 120' is less than about 55 degrees, about 50 degrees, or about 45 degrees.

As is apparent from the graph 124, the intensity distribution 69 has sharp edge characteristics such that the cones of light 60 and the cones of image light 65 have a substantially high luminance intensity in the full width WP and a substantially low luminance intensity outside the full width WP. Further, each of the cones of image light 65 includes the substantially flat peak 62'.

Figures 4A, 4B:
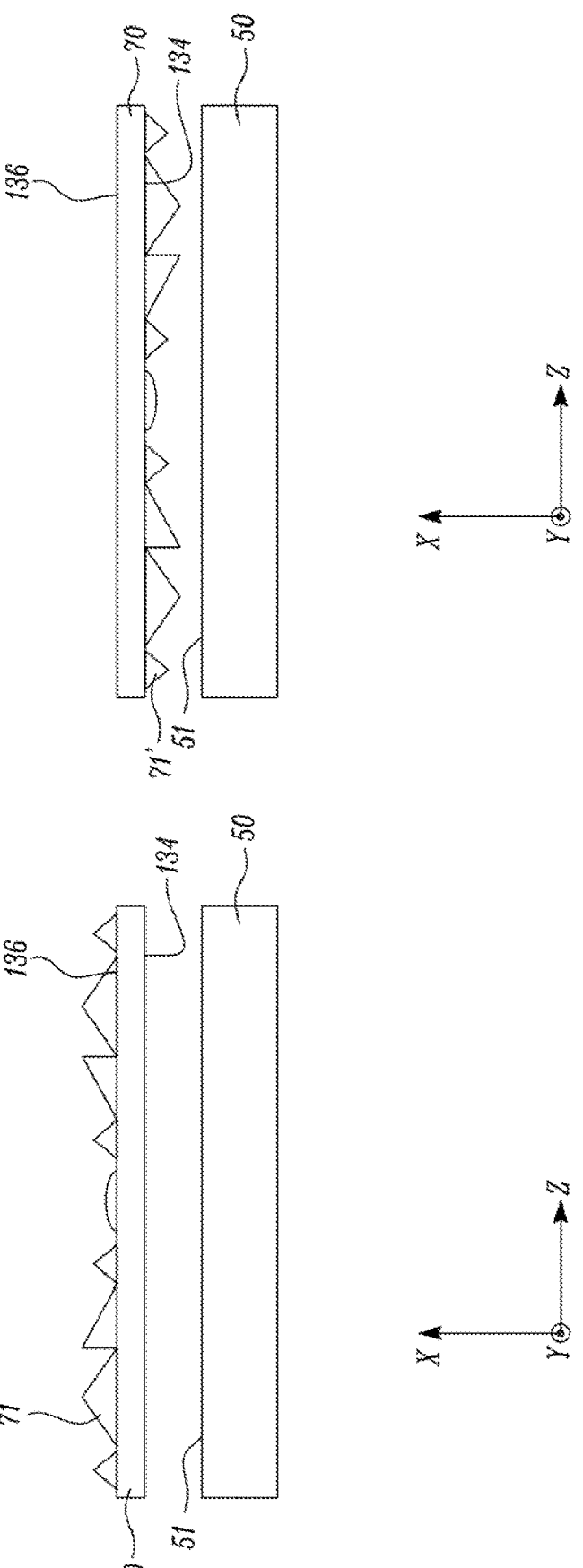
FIG. 4A illustrates a schematic view of a light redirecting film, according to an embodiment of the present disclosure.
FIG. 4B illustrates a schematic view of a light redirecting film, according to another embodiment of the present disclosure.

FIG. 4A shows a schematic view of the light redirecting film 70 according to an embodiment of the present disclosure. The light redirecting film 70 includes a regular array of light redirecting elements 71.

In this embodiment, the light redirecting elements 71 face away from the emission surface 51. Specifically, the regular array of light redirecting elements 71 are disposed on the first surface 136 of the light redirecting film 70.

FIG. 4B shows a schematic view of the light redirecting film 70, according to another embodiment of the present disclosure. The light redirecting film 70 includes a regular array of light redirecting elements 71'. In this embodiment, the light redirecting elements 71' face the emission surface 51. Specifically, the regular array of light redirecting elements 71' are disposed on the second surface 134 of the light redirecting film 70.

Referring to FIGS. 4A and 4B, in some other embodiments, the light redirecting film 70 may include both the light redirecting elements 71 and the light redirecting elements 71'.

In some embodiments, the regular array of light redirecting elements 71, 71' includes primarily a bulk diffuser. Generally, in bulk diffusers, small particles, or spheres of a different refractive index are embedded within a primary material of the bulk diffuser. The embedded small particles or spheres act as light scattering elements. In some other embodiments, a refractive index of a material of the bulk diffuser varies across a body of the bulk diffuser, thus causing light passing through the material to be refracted or scattered at different points.

In some embodiments, the regular array of the light redirecting elements 71, 71' includes primarily a surface diffuser. Generally, surface diffusers utilize surface roughness to refract or scatter light in a number of directions. The rough surfaces of the surface diffuser may be exposed to air or a surrounding medium, and may cause the angular spread for an incident light.

In some embodiments, the light redirecting elements 71, 71' may be microstructures.

It should be understood that the shapes and configurations of the light redirecting elements 71, 71' as shown in FIGS. 4A and 4B are exemplary and may vary as per desired application attributes.

In some embodiments, the light redirecting elements 71, 71' may have different shapes and sizes such that the cones of image light 65 transmitted by the light redirecting film 70 substantially covers the display panel 30 (shown in FIG. 1). In some embodiments, the light redirecting elements 71, 71' may have a concave shape or a convex shape. Further, some light redirecting elements 71, 71' may include a triangular shape, such as a right-angled triangle or an isosceles triangle. Further, the light redirecting elements 71, 71' may be evenly disposed on the light redirecting film 70 to refract the cones of light 60. Moreover, the light redirecting elements 71, 71' may define a refractive index to redirect the cones of light 60. The light redirecting film 70 may allow usage of the smaller illumination source 50 with the display panel 30. In some embodiments, the light redirecting film 70 may enhance a brightness of the image 31 formed by the display panel 30.

In some embodiments, the light redirecting elements 71, 71' may have different shapes and sizes and may be arranged over the light redirecting film 70 in a two-dimensional array. In some embodiments, the light redirecting elements 71, 71' may have different shapes and sizes in a radial direction and may be circularly symmetrically arranged over the light redirecting film 70, such as in a Fresnel lens.

Figure 5B:
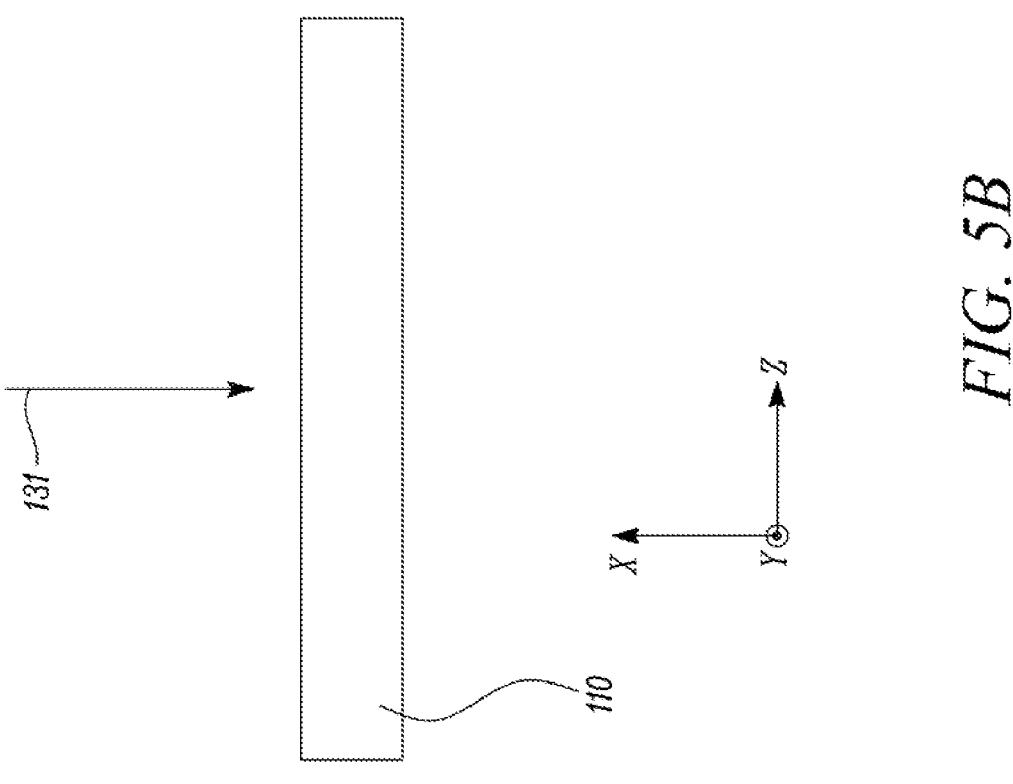
FIG. 5B is a schematic view of a reflective polarizer, according to an embodiment of the present disclosure.
Figure 5A:
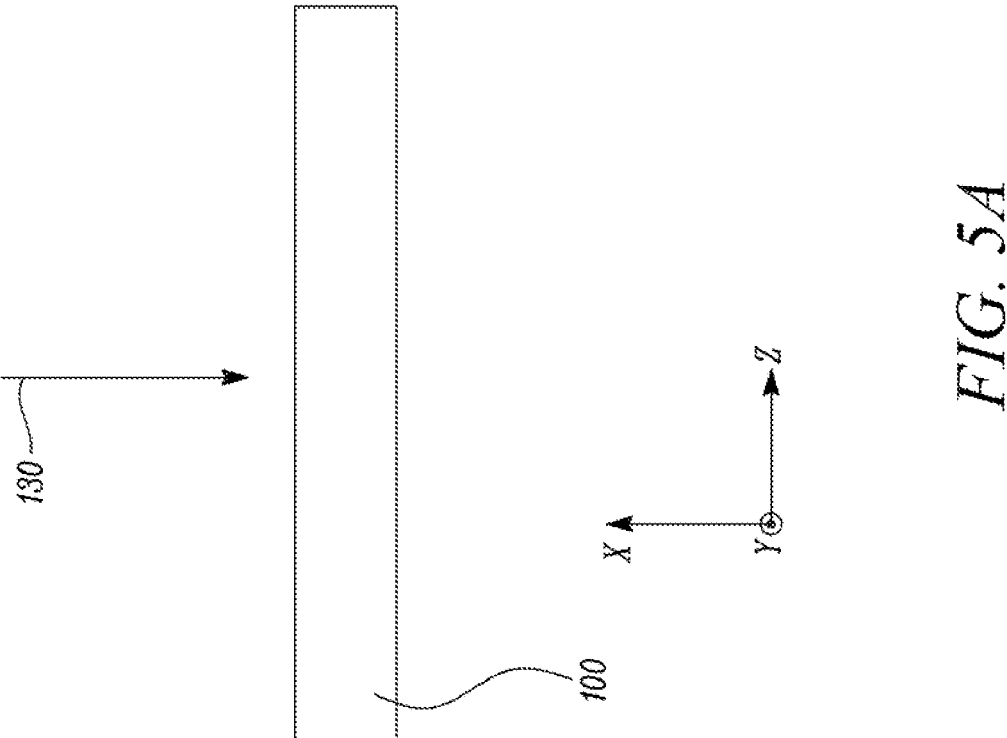
FIG. 5A is a schematic view of a partial reflector, according to an embodiment of the present disclosure.

FIG. 5A shows a schematic view of the partial reflector 100, according to an embodiment of the present disclosure.

In some embodiments, the partial reflector 100 may include a metallic surface. In some embodiments, the partial reflector 100 may include one or more elements, such as silver, aluminum, a non-conductive coating, etc.

In some embodiments, for a substantially normally incident light 130 and for each of mutually orthogonal polarization states, the partial reflector 100 reflects at least 30% of the incident light 130 and transmits at least 30% of the incident light 130. In some embodiments, the mutually orthogonal polarization states may extend along the Y-axis and the Z-axis. In some embodiments, for the substantially normally incident light 130 and for each of the mutually orthogonal polarization states, the partial reflector 100 reflects at least 35%, at least 40%, or at least 45% of the incident light 130 and transmits at least 35%, at least 40%, or at least 45% of the incident light 130.

FIG. 5B shows a schematic view of the reflective polarizer 110, according to an embodiment of the present disclosure.

In some embodiments, the reflective polarizer 110 is an Advanced Polarizing Film (APF) available from 3M Company, St. Paul, MN. However, the reflective polarizer 110 may be any suitable reflective polarizer. In some embodiments, the reflective polarizer 110 may include one or more of a multilayer polymeric reflective polarizer, a wire grid reflective polarizer, and a diffuse reflective polarizer.

The reflective polarizer 110 includes a plurality of polymeric layers (not shown) numbering at least 10 in total. In some embodiments, the reflective polarizer 110 includes the plurality of polymeric layers disposed in a stacked configuration. In some embodiments, each of the polymeric layers has an average thickness of less than about 500 nm.

In some embodiments, one of the polymeric layers includes a material with a high refractive index relative to the other. In some embodiments, at least one of the polymeric layers includes a birefringent material. In some embodiments, the reflective polarizer 110 may further include at least one intermediate layer (not shown). In some embodiments, the intermediate layer may include a material with a low refractive index.

In some embodiments, the reflective polarizer 110 further includes at least one skin (not shown) disposed on the plurality of polymeric layers thereof. The at least one skin may protect the plurality of polymeric layers, and may also provide mechanical stability to the reflective polarizer 110. In some cases, the at least one skin may act as protective boundary layer (PBL). In some embodiments, the at least one skin has an average thickness of greater than about 500 nm.

In some embodiments, for a substantially normally incident light 131, the reflective polarizer 110 reflects at least 60% of the incident light 131 polarized along a first in-plane direction and transmits at least 60% of the incident light 131 polarized along an orthogonal second in-plane direction. In some embodiments, the first in-plane direction may be along the Y-axis and the second in-plane direction may be along the Z-axis.

In some examples, for the substantially normally incident light 131, the reflective polarizer 110 reflects at least 55%, at least 70%, at least 75%, at least 80%, at least 85%, or at least 90% of the incident light 131 polarized along the first in-plane direction and transmits at least 55%, at least 70%, at least 75%, at least 80%, at least 85%, or at least 90% of the incident light 131 polarized along the orthogonal second in-plane direction. Therefore, the reflective polarizer 110 may substantially allow light of a specific polarization to pass through while substantially blocking light of an orthogonal polarization.

Referring to FIGS. 1 and 2, each cone of image light 65 from the display panel 30 may be designed to match the corresponding cone of light 60 from the illumination source 50. Further, an angle between the central rays of the transmitted cones of light and the optical axis 10 may vary spatially across the display panel 30. For example, the central rays of the transmitted cones of light proximal to the optical axis 10 may be substantially parallel to the optical axis 10. However, the central rays of the transmitted cones of light distal to the optical axis 10 may be inclined to the optical axis 10. This may ensure that the transmitted cones of light substantially cover the display panel 30 despite the emission surface 51 being smaller in the length L and width W than the display panel 30. Further, this may improve luminance uniformity of the virtual image 32.

Therefore, the present disclosure provides the optical system 300 for VR/AR applications which may be compact and may provide an improved luminance uniformity, contrast, and brightness of the virtual image 32. Further, the optical system 300 may substantially reduce occurrences of optical artifacts, such as ghost images in the virtual image 32.

Figure 6:
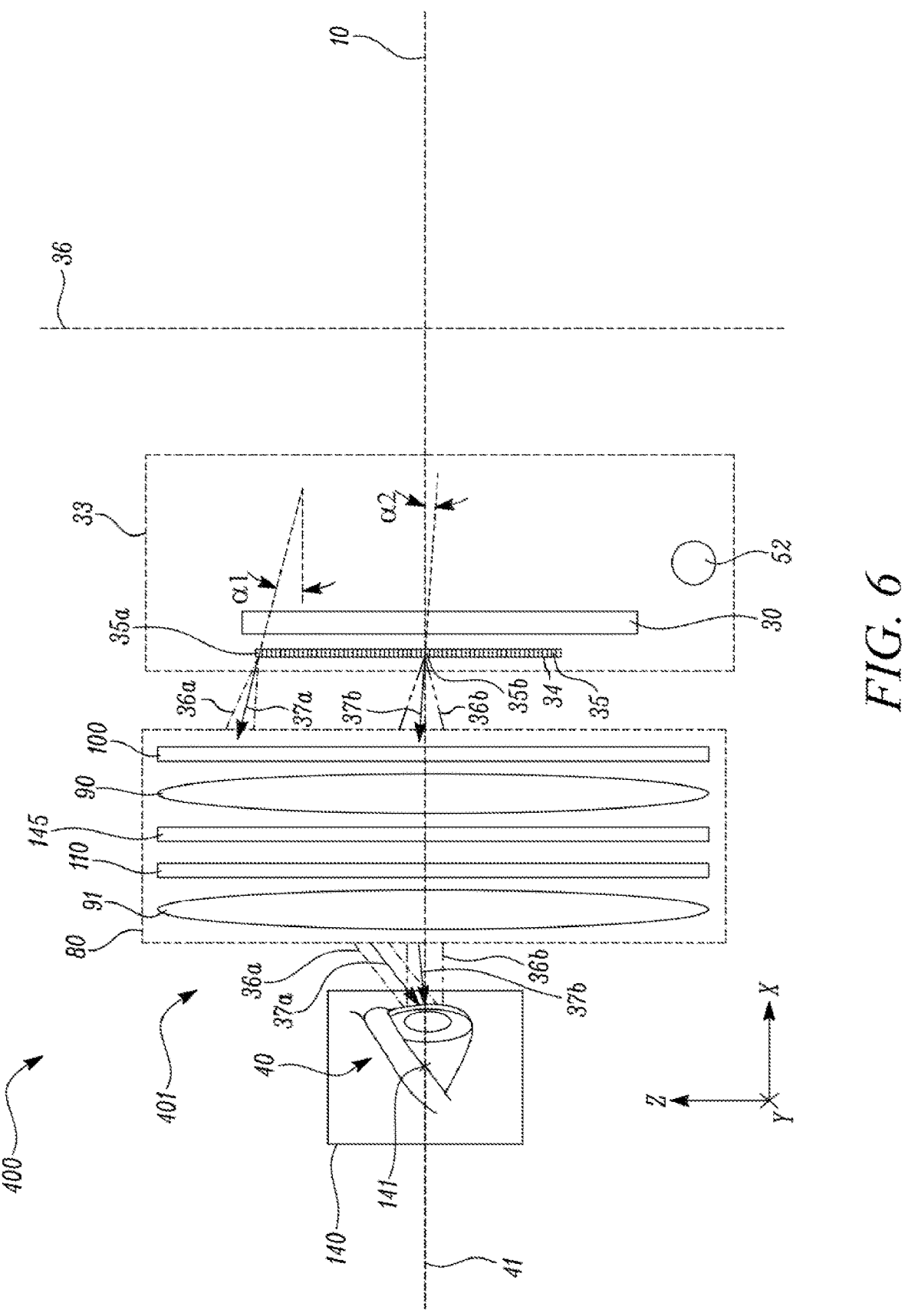
FIG. 6 illustrates a schematic view of an optical system, according to another embodiment of the present disclosure.

FIG. 6 illustrates a schematic view of an optical system 400, according to an embodiment of the present disclosure. The optical system 400 may be substantially similar to the optical system 300 explained in relation to FIG. 1. Common components between the optical system 400 and the optical system 300 are referred to by the same reference numerals. As shown in FIG. 6, the optical system 400 includes a display system 33, the at least one lens 90, 91, and the reflective polarizer 110. The display system 33 may be similar to the display panel 30 explained in relation to FIG. 1. However, the display system 33 is configured to generate a pixelated image 34 including a plurality of image pixels 35. Further, the optical system 400 is configured to display a virtual image 36 of the generated pixelated image 34 in focus to the eye 40 of the viewer disposed at or near the optical system axis 10 with an optical axis 41 of the eye 40 substantially coincident with the optical system axis 10.

A first image pixel 35a of the pixelated image 34 farthest from the optical system axis 10 and a second image pixel 35b of the pixelated image 34 closest to the optical system axis 10 emit respective first and second cones of image light 36a, 36b having respective first and second central light rays 37a, 37b making a first angle a1 of greater than about 15 degrees and a second angle a2 of less than about 5 degrees, respectively, with the optical system axis 10. In some examples, the first angle a1 may be greater than about 20 degrees, greater than about 25 degrees, greater than about 30 degrees, greater than about 35 degrees, greater than about 40 degrees, greater than about 45 degrees, or greater than about 50 degrees. In some examples, the second angle a2 may be less than about 4 degrees, less than about 3 degrees, less than about 2 degrees, or less than about 1 degree. The first and second central light rays 37a, 37b both enter the eye 40 of the viewer after passing through the at least one lens 90, 91 and the reflective polarizer 110.

Further, in some embodiments, the optical system 400 further includes an eye box 140. The eye box 140 includes a center 141 disposed on the optical system axis 10. The optical system 400 is configured to display the virtual image 36 of the generated pixelated image 34 to the eye 40 of the viewer disposed in the eye box 140. The eye 40 is positioned proximate an eye-side 401 of the optical system 400.

Figure 7:
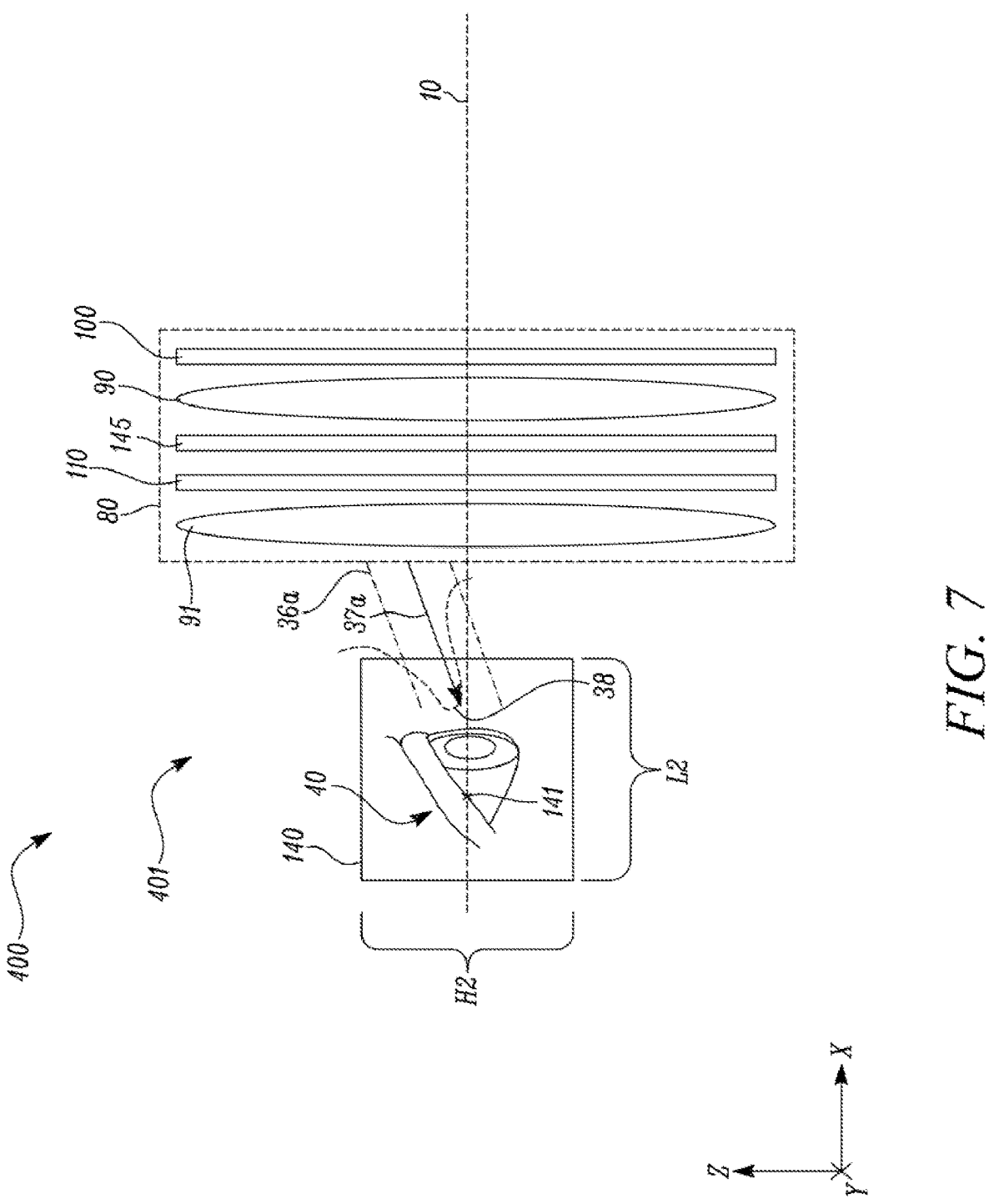
FIG. 7 illustrates a partial schematic view of the optical system of FIG. 6, according to an embodiment of the present disclosure.

FIG. 7 illustrates a schematic view of the optical system 400 with some components not shown for clarity purposes. The eye 40 of the viewer is disposed in the eye box 140.

In some examples, the eye box 140 has a length L2 along the optical system axis 10, a width (not shown) along a width direction orthogonal to the optical system axis 10, and a height H2 along a height direction orthogonal to the width direction and the optical system axis 10. In some embodiments, the length L2 may extend along the X-axis, the width direction may be along the Y-axis, and the height direction may be along the Z-axis.

In some embodiments, each of the length L2, the width, and the height H2 is less than about 30 mm. In some examples, each of the length L2, the width, and the height H2 may be less than about 25 mm, less than about 20 mm, less than about 15 mm, or less than about 10 mm.

Referring to FIGS. 6 and 7, the first image pixel 35a of the pixelated image 34 farthest from the optical system axis 10 emits the first cone of image light 36a that after passing through the at least one lens 90, 91 and the reflective polarizer 110, enters the eye box 140 and crosses the optical system axis 10 in the eye box 140 at or near a peak intensity 38 of the first cone of image light 36a.

Figure 8:
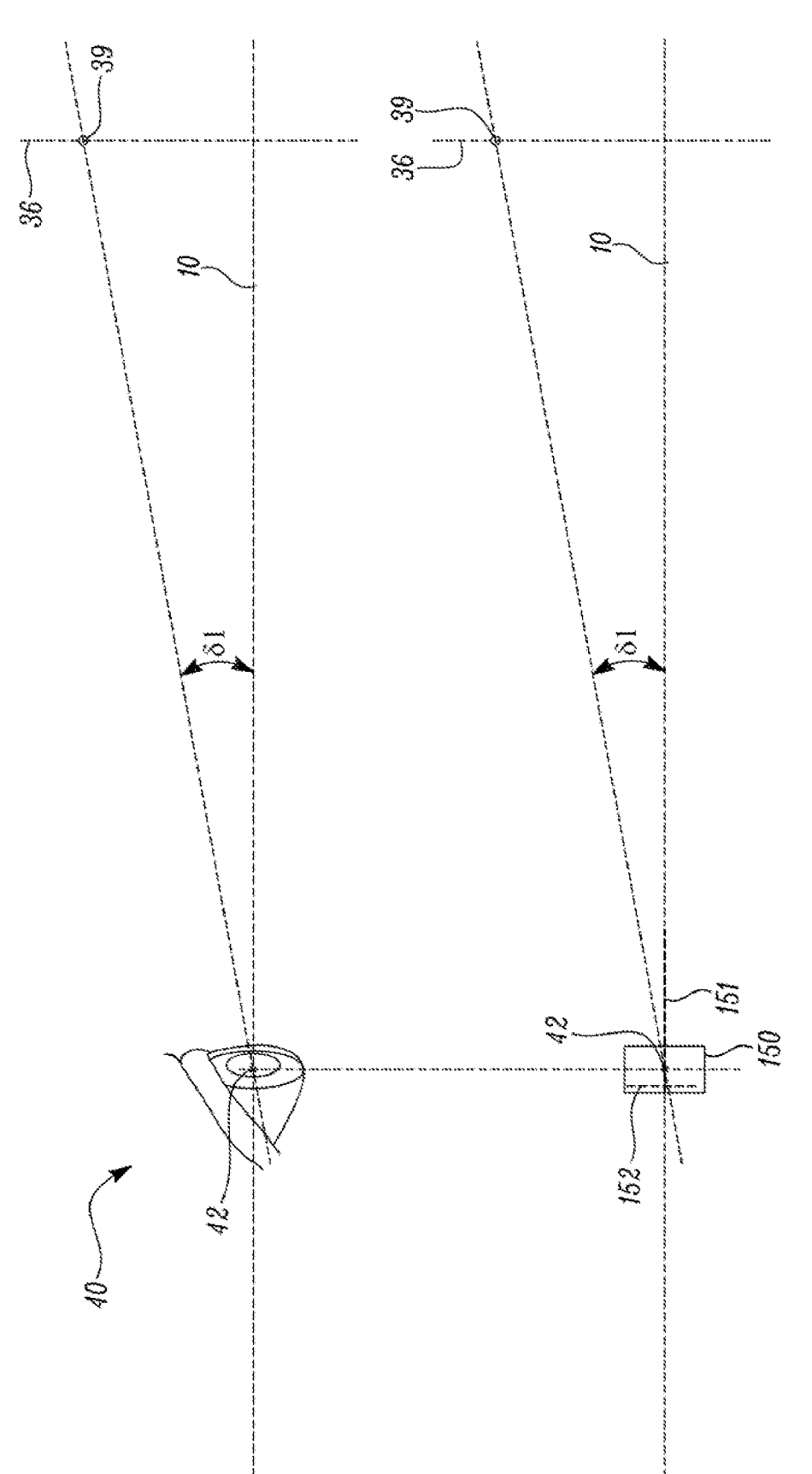
FIG. 8 illustrates a schematic view of an eye and an imaging system, according to an embodiment of the present disclosure.
Figure 9:
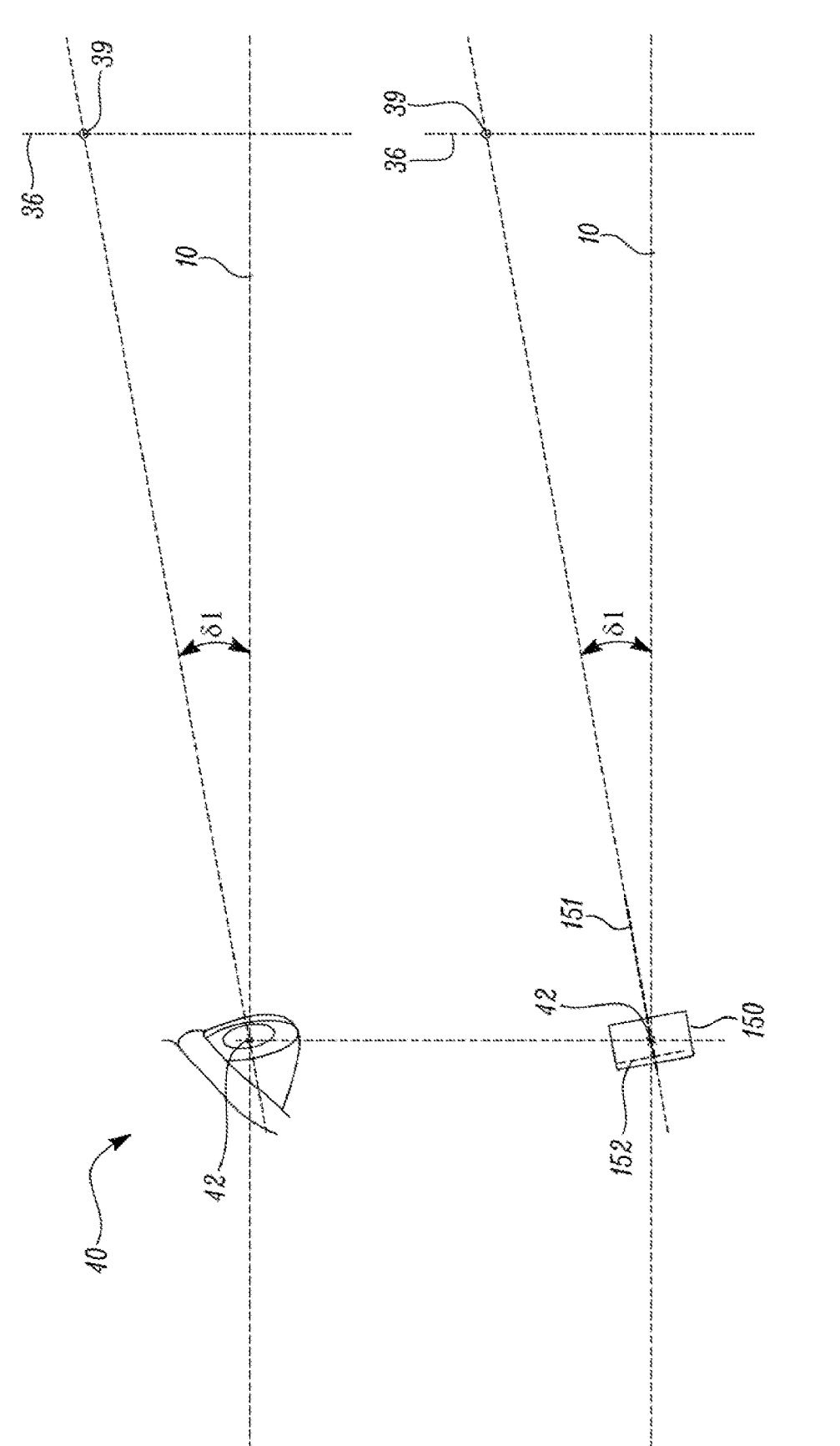
FIG. 9 illustrates a schematic view of the eye and the rotated imaging system, according to an embodiment of the present disclosure.

FIGS. 8 and 9 illustrate schematic views of the eye 40 and an imaging system 150, according to an embodiment of the present disclosure. Specifically, FIG. 8 illustrates a schematic view of the eye 40 and the imaging system 150 having an imaging system axis 151 substantially parallel to the optical system axis 10. FIG. 9 illustrates a schematic view of the eye 40 and the rotated imaging system 150 such that the imaging system axis 151 is inclined with respect to the optical system axis 10.

Referring to FIGS. 6 to 9, the optical system 400 forms the virtual image 36 of the generated pixelated image 34 emitted by the display system 33 for viewing by the eye 40 when the eye 40 is positioned proximate an eye-location 42 on the eye-side 401 of the optical system 400.

For a first virtual image location 39 at a corresponding first field angle d1 of between about 15 degrees and about 50 degrees relative to the optical system axis 10, when the imaging system 150 centered on the imaging system axis 151 is positioned proximate the eye-location 42 and forms an image 152 of the virtual image 36 corresponding to the first virtual image location 39, an intensity of the formed image 152 increases as the imaging system 150 is at least rotated so that the imaging system axis 151 approaches the first field angle d1. In some embodiments, the first field angle d1 is a maximum field angle of the formed virtual image 36. Therefore, the optical system 400 may improve luminance uniformity of the virtual image 36 by reducing vignetting of in the far field.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical system centered on an optical axis and comprising:

an aperture stop;

a display panel configured to generate an image, the optical system configured to display a virtual image of the generated image to an eye of a viewer disposed on the optical axis proximate the aperture stop;

an illumination source configured to provide illumination to the display panel from an emission surface of the illumination source, the emission surface of the illumination source comprising a plurality of locations, a cone of light emitted through each location of the plurality of locations on the emission surface of the illumination source comprising a central light ray propagating along a direction parallel to the optical axis and having a peak intensity and corresponding full widths W80 and W30 at respective eighty and thirty percent of maximum, W80 and W30 within about 30% of each other;

a light redirecting film disposed between the display panel and the emission surface of the illumination source and comprising a regular array of light redirecting elements configured to receive, transmit, and redirect at least some of, the cones of light emitted through the emission surface of the illumination source so that the transmitted cones of light cover the display panel and are transmitted thereby as corresponding cones of image light; and a lens assembly disposed between the display panel and the aperture stop and comprising at least one of a lens, a partial reflector, and a reflective polarizer, such that the cones of image light pass through the aperture stop after going through the lens assembly.

2. The optical system of claim 1, wherein the central light ray of each cone of light emitted through each location of the plurality of locations on the emission surface of the illumination source makes an angle of less than about 5 degrees with the optical axis.

3. The optical system of claim 1, wherein each of the transmitted cones of light transmitted by the light redirecting film has a peak intensity and corresponding full widths W'80 and W'30 at respective eighty and thirty percent of maximum, W'80 and W'30 within about 30% of each other.

4. The optical system of claim 1, wherein each of the cones of image light comprises a flat peak having a full width of at least 15 degrees across which the peak changes by less than about 20%, and a corresponding fullwidth at half maximum that is less than about 60 degrees.

5. The optical system of claim 1, wherein the lens assembly comprises at least one lens, a partial reflector, and a reflective polarizer, each of the cones of image light passing through the aperture stop after going through each of the at least one lens, the partial reflector, and the reflective polarizer.

6. The optical system of claim 5, wherein each of the cones of image light passes through the aperture stop after further being reflected at least once by each of the partial reflector and the reflective polarizer.

7. The optical system of claim 1, wherein the emission surface of the illumination source is smaller in a length and a width than the display panel.

8. The optical system of claim 1, wherein the regular array of light redirecting elements comprises facets of a Fresnel lens.

9. The optical system of claim 1, wherein the aperture stop has a size of between about 1 mm and about 10 mm.

10. The optical system of claim 1, wherein the lens assembly comprises at least one lens.

11. The optical system of claim 1, wherein the lens assembly comprises a partial reflector, such that for a normally incident light and for each of mutually orthogonal polarization states, the partial reflector reflects at least 40% of the incident light and transmits at least 40% of the incident light.

12. The optical system of claim 1, wherein the lens assembly comprises a reflective polarizer, such that for a normally incident light, the reflective polarizer reflects at least 60% of the incident light polarized along a first in-plane direction and transmits at least 60% of the incident light polarized along an orthogonal second in-plane direction.

13. The optical system of claim 1 further comprising a retarder layer, such that for a central light ray of at least one of the cones of image light, the retarder changes a phase of the central light ray by at least 20 degrees.

* * * * *